United States Patent
Zhang et al.

(10) Patent No.: US 11,663,705 B2
(45) Date of Patent: May 30, 2023

(54) IMAGE HAZE REMOVAL METHOD AND APPARATUS, AND DEVICE

(71) Applicant: NANJING UNIVERSITY OF POSTS AND TELECOMMUNICATIONS, Nanjing (CN)

(72) Inventors: Dengyin Zhang, Nanjing (CN); Hong Zhu, Nanjing (CN); Wensheng Han, Nanjing (CN); Weidan Yan, Nanjing (CN); Yingjie Kou, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 17/987,763

(22) Filed: Nov. 15, 2022

(65) Prior Publication Data
US 2023/0089280 A1   Mar. 23, 2023

Related U.S. Application Data

(63) Continuation of application No. PCT/CN2022/107282, filed on Jul. 22, 2022.

(30) Foreign Application Priority Data

Sep. 17, 2021   (CN) .......................... 202111091274.2

(51) Int. Cl.
*G06T 5/00*   (2006.01)

(52) U.S. Cl.
CPC .... *G06T 5/006* (2013.01); *G06T 2207/20084* (2013.01)

(58) Field of Classification Search
CPC ...................... G06T 5/006; G06T 2207/20084
USPC ........................................................... 382/100
See application file for complete search history.

(56) References Cited

U.S. PATENT DOCUMENTS

| | | | |
|---|---|---|---|
| 2016/0005152 A1* | 1/2016 | Yang | G06T 5/003 382/275 |
| 2016/0071244 A1* | 3/2016 | Huang | G06T 5/009 382/263 |
| 2019/0294931 A1 | 9/2019 | Risser et al. | |
| 2020/0184606 A1* | 6/2020 | Elron | G06N 3/045 |
| 2022/0321852 A1* | 10/2022 | Zhu | G06T 3/40 |
| 2023/0013779 A1* | 1/2023 | Langoju | G06T 5/20 |
| 2023/0026811 A1* | 1/2023 | Zhou | G06V 10/60 |

FOREIGN PATENT DOCUMENTS

| | | | |
|---|---|---|---|
| CN | 111814753 A | | 10/2020 |
| CN | 113269685 A | | 8/2021 |
| CN | 113284070 A | | 8/2021 |
| CN | 113344806 A | * | 9/2021 |

(Continued)

*Primary Examiner* — Van D Huynh
(74) *Attorney, Agent, or Firm* — Nitin Kaushik

(57) ABSTRACT

The present disclosure discloses an image haze removal method and apparatus, and a device. The method includes: acquiring a hazy image to be processed; and obtaining a haze-free image corresponding to the hazy image by inputting the hazy image into a pre-trained haze removal model. The present disclosure uses the residual dual attention fusion modules as basic modules of the neural network, so that each feature map can obtain pixel features while enhancing the global dependence, thus improving the image dehazing effect.

10 Claims, 7 Drawing Sheets

1. Hazy image    2. Input end
3. Pre-trained haze removal model
4. Haze-free image    5. Output end

(56) References Cited

FOREIGN PATENT DOCUMENTS

| CN | 113947537 A |   | 1/2022 |
|----|-------------|---|--------|
| CN | 115587934 A | * | 1/2023 |
| CN | 115619677 A | * | 1/2023 |

* cited by examiner

1. Hazy image  2. Input end
3. Pre-trained haze removal model
4. Haze-free image  5. Output end 1. Global average pooling     2. Convolutional layer 3. Element-by-element product 1. Convolutional layer 1.Residual dual attention fusion module    2.   Convolutional layer 1. Convolutional layer 2. Channel attention module

IMAGE HAZE REMOVAL METHOD AND APPARATUS, AND DEVICE

CROSS-REFERENCE TO RELATED APPLICATIONS

The application claims priority to Chinese patent application No. 202111091274.2, filed on Sep. 17, 2021, the entire contents of which are incorporated herein by reference

TECHNICAL FIELD

The present application mainly relates to the technical field of image processing, and more particularly, relates to an image haze removal method and apparatus, and a device.

BACKGROUND

In recent years, with the development of society, haze has become a current atmospheric phenomenon that is prevalent in computer vision. Due to the presence of numerous suspended particles, light is reflected during propagation, resulting in blurring of outdoor images, color distortion and contrast reduction. Advanced image processing tasks, such as target detection, target recognition and industrial IoT, require clear images as input, and hazy images may affect the quality and robustness of subsequent advanced tasks. Therefore, as an image preprocessing task, image haze removal is a classic image processing problem, which has always been a hot topic for researchers.

At present, image haze removal algorithms are mainly based on deep learning methods, and deep learning-based haze removal networks treat channels and pixel features equally. However, haze is non-homogeneous, such as light haze and dense haze, and pixel weights of close and long shots should be significantly different. Therefore, as the haze removal networks treat channels and pixel features equally, a haze removal effect is poor, and images still inevitably keep deep haze after haze removal, losing details of the images.

SUMMARY

In order to overcome the defects in the prior art, the present disclosure provides an image haze removal method and apparatus, and a device.

In a first aspect, the present disclosure provides an image haze removal method. The method includes:
acquiring a hazy image to be processed; and
obtaining a haze-free image corresponding to the hazy image to be processed by inputting the hazy image to be processed into a pre-trained haze removal model.

The pre-trained haze removal model includes a plurality of residual groups, each of the residual groups includes a plurality of residual dual attention fusion modules connected in series, each of the residual dual attention fusion modules includes a residual block, a first convolutional layer, a channel attention module, a pixel attention module, and a second convolutional layer, an output of the residual block is connected to inputs of the channel attention module and the pixel attention module via the first convolutional layer, and outputs of the channel attention module and the pixel attention module are fused for output processing, such that pixel features are obtained while global dependency of each feature map is enhanced.

Further, the haze removal model includes three residual groups, and the three residual groups are in in-channel connection according to outputs from back to front.

Further, each of the residual groups includes three residual dual attention fusion modules.

Further, the outputs of the residual dual attention fusion modules are obtained by inputting the outputs of the channel attention module and the pixel attention module and an input of the residual block into the second convolutional layer for fusion after element-by-element summation.

Further, the haze removal model further includes a feature extraction convolutional layer, a channel attention module, a pixel attention module, and an output convolutional layer, the hazy image to be processed enters the residual groups after being subjected to feature extraction by the feature extraction convolutional layer, and enters the channel attention module, the pixel attention module and the output convolutional layer in sequence for processing after being processed by the residual groups, so as to obtain output features, and the haze-free image is obtained by performing element-by-element summation on the output features and the hazy image to be processed.

Further, the haze removal model is trained by:
acquiring an RESIDE dataset, and constructing a training sample set by randomly selecting 6000 pairs of hazy images and haze-free images from the RESIDE dataset; and
training a pre-established neural network with the training sample set.

Further, a loss function L of the neural network is expressed as:

$$L = \frac{1}{N}\sum_{i=1}^{N}\left\|\hat{J}_i - J_i^{gt}\right\|_1 \tag{1}$$

where N is the number of training samples, $J_i^{gt}$ is a real clear image of an i-th training sample, and $\hat{J}_i$ is a haze-free image estimated by the neural network for the i-th training sample.

In a second aspect, the present disclosure further provides an image haze removal apparatus. The apparatus includes:
an image acquiring module, configured to acquire a hazy image to be processed; and
an image haze removal module, configured to input the hazy image to be processed into a haze removal model for processing, and output a haze-free image corresponding to the hazy image to be processed.

The haze removal model includes a plurality of residual groups, each of the residual groups includes a plurality of residual dual attention fusion modules connected in series, each of the residual dual attention fusion modules includes a residual block, a first convolutional layer, a channel attention module, a pixel attention module, and a second convolutional layer, an output of the residual block is connected to inputs of the channel attention module and the pixel attention module via the first convolutional layer, and outputs of the channel attention module and the pixel attention module are fused, such that pixel features are obtained while global dependency of each feature map is enhanced.

Further, the outputs of the residual dual attention fusion modules are obtained by inputting the outputs of the channel attention module and the pixel attention module and an input of the residual block into the second convolutional layer for fusion after element-by-element summation.

In a third aspect, the present disclosure further provides a device. The device includes a memory, a processor, and a computer program stored on the memory and capable of running on the processor, and the processor, when executing the computer program, implements the image haze removal method according to any of the first aspect.

Compared with the prior art, the present disclosure has the following beneficial effects:

First, the present disclosure improves a convolutional neural network with a fixed receptive field, and uses the residual dual attention fusion modules as basic modules, and each of the residual dual attention fusion modules is formed by fusion of the residual block, the channel attention module, and the pixel attention module. By combining relevant features of different feature maps, the pixel features are obtained while the global dependency of each feature map is enhanced, details are better preserved while the number of parameters is reduced, and the haze removal effect is improved.

Second, the present disclosure adopts an end-to-end haze removal network, and only three residual dual attention fusion modules are set inside each residual group, thus reducing the complexity of the model and improving the efficiency of model training.

DETAILED DESCRIPTION OF THE EMBODIMENTS

The present disclosure is further illustrated below in conjunction with the accompanying drawings. The following examples are provided merely to more clearly illustrate the technical solution of the present disclosure, and are not intended to limit the scope of the present disclosure.

Example 1

Figure 1:
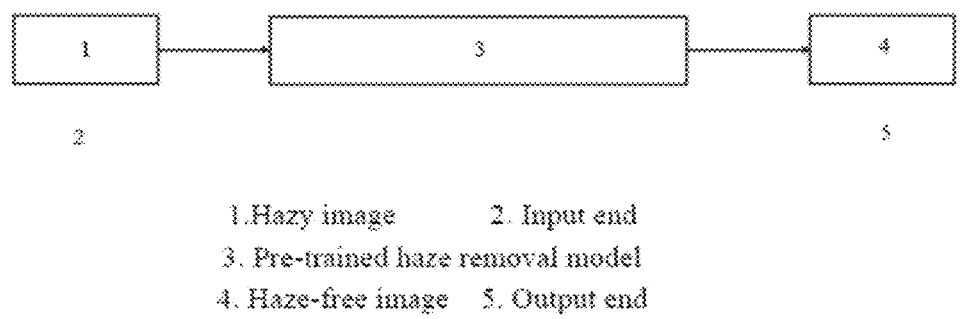
FIG. 1 is a flow chart of an image haze removal method according to an embodiment of the present disclosure.

As shown in FIG. 1, the present disclosure provides an image haze removal method. The method establishes an image haze removal model based on a neural network, but improves a convolutional neural network with a fixed receptive field, and uses residual dual attention fusion modules as basic modules. Each residual dual attention fusion module is formed by fusion of a residual block, a channel attention module, and a pixel attention module.

Figure 2:
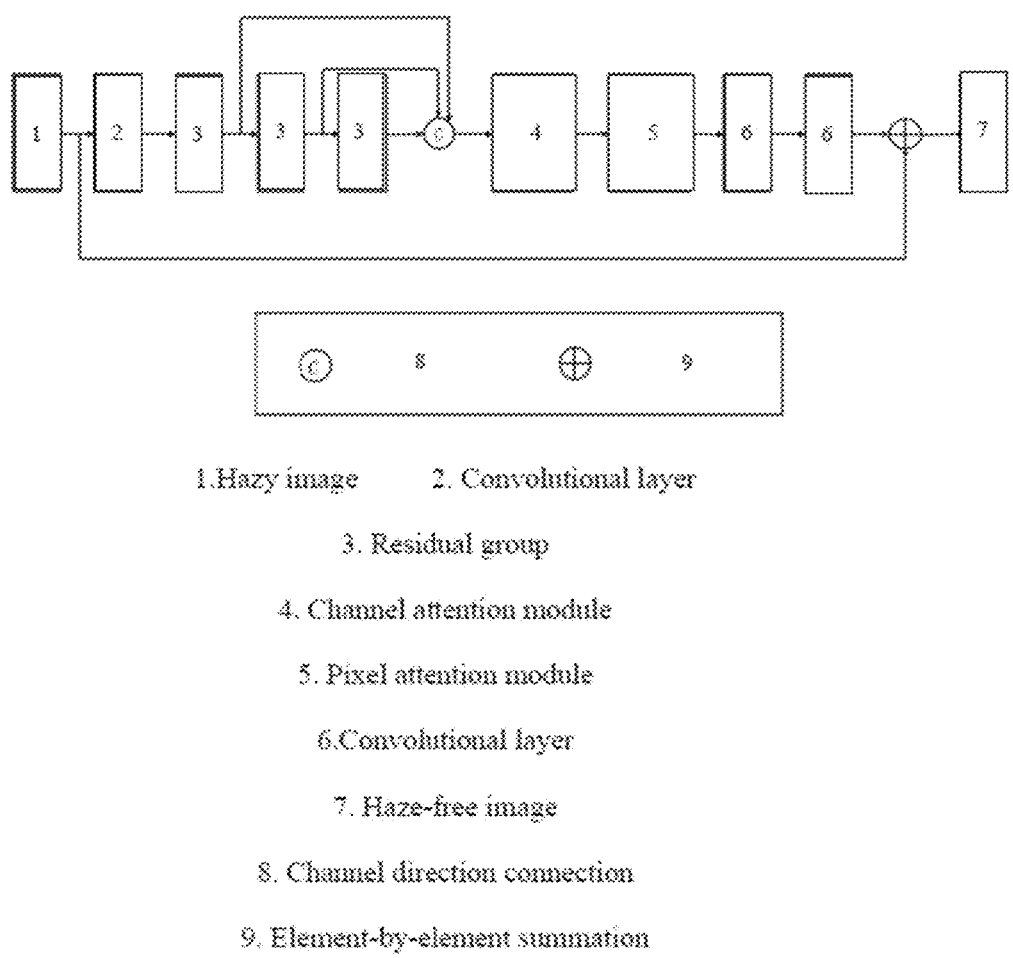
FIG. 2 is a schematic structural diagram of a haze removal model according to an embodiment of the present disclosure.

Specifically, as shown in FIG. 2, the haze removal model includes a feature extraction convolutional layer, three residual groups, a channel attention module, a pixel attention module, and two output convolutional layers. The three residual groups are in in-channel connection according to outputs from back to front. A hazy image to be processed enters the residual groups after being subjected to feature extraction by the feature extraction convolutional layer, and enters the channel attention module, the pixel attention module and the two output convolutional layers in sequence for processing after being processed by the residual groups, so as to obtain output features. A haze-free image is obtained by performing element-by-element summation on the output features and the hazy image to be processed.

Figure 3:
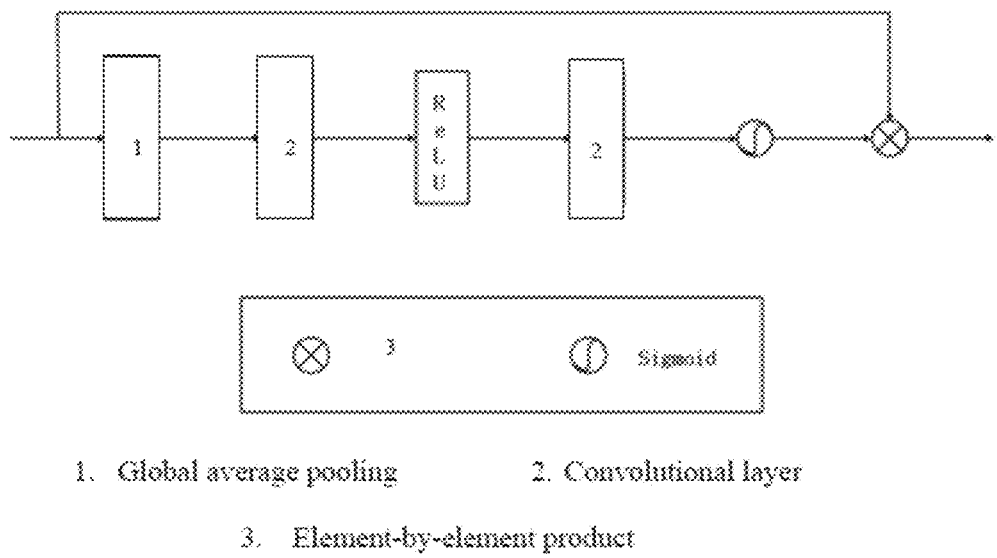
FIG. 3 is a schematic diagram of a channel attention module according to an embodiment of the present disclosure.

As shown in FIG. 3, in the channel attention module, input features are input into global average pooling, a convolutional layer, an ReLU activation function, a convolutional layer, and a Sigmoid activation function. An output of the channel attention module is obtained by element-by-element multiplication of an obtained output weight and the input features, with expressions as follows:

$$G^c = \frac{1}{H \times W} \sum_{x=1}^{H} \sum_{y=1}^{W} Z^c(x, y) \tag{1}$$

$$F_{CAB}^c = \sigma(Conv(\delta(Conv(G_c)))) \otimes F^c \tag{2}$$

$$F_{CAB}^c = H_{CAB}(F^c) \tag{3}$$

where $Z^c(x,y)$ represents a pixel value of an input $Z^c$ of a c-th channel at a position (x,y), and $c \in \{R, G, B\}$; after global average pooling, the dimension of a feature map is changed from C×H×W to C×1×1; $\delta$ represents the ReLU activation function, $\sigma$ represents the Sigmoid activation function, $\otimes$ represents element-by-element multiplication; and a mapping function from an input $F^c$ of the channel attention module to the output $F_{CAB}^c$ of the channel attention module is $H_{CAB}$.

The first convolutional layer of the channel attention module uses 8 convolutional kernels with the size of 1*1, and the second convolutional layer uses 64 convolutional kernels with the size of 1*1.

Figure 4:
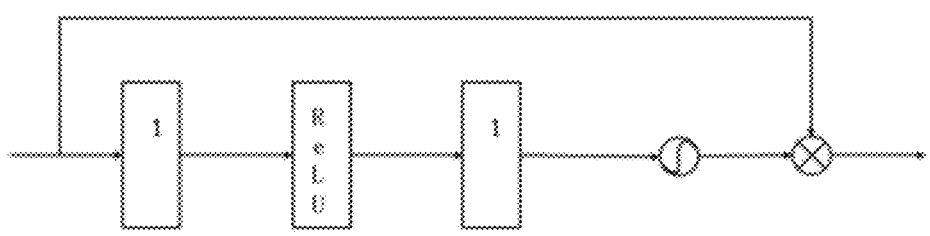
FIG. 4 is a schematic diagram of a pixel attention module according to an embodiment of the present disclosure.

As shown in FIG. 4, in the pixel attention module, the input features are input into a convolutional layer, an ReLU activation function, a convolutional layer, and a Sigmoid activation function. An output of the pixel attention module is obtained by element-by-element multiplication of an obtained output weight and the input features, with expressions as follows:

$$F_{PA} = \sigma(Conv(\delta(Conv(F)))) \tag{4}$$

$$F_{PAB} = F_{PA} \otimes F \tag{5}$$

$$F_{PAB} = H_{PAB}(F) \tag{6}$$

where $F_{PA}$ represents the feature weight of the output, the dimension is changed from C×H×W to 1×H×W, and a mapping function from an input F of the pixel attention module to the output $F_{PAB}$ of the pixel attention module is $H_{PAB}$.

The first convolutional layer of the pixel attention module uses 8 convolutional kernels with the size of 1*1, and the second convolutional layer uses 1 convolutional kernel with the size of 1*1. Other convolutional layers use 64 convolutional kernels with the size of 3*3.

Figure 5:
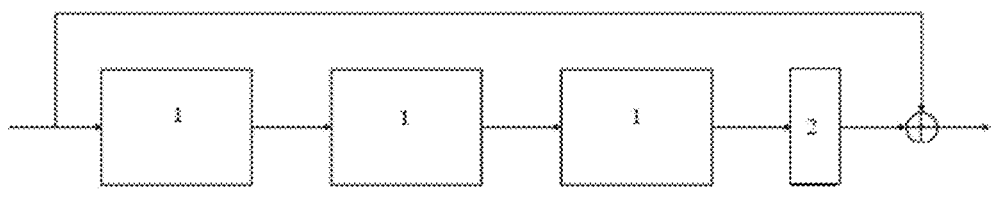
FIG. 5 is a schematic diagram of a residual group according to an embodiment of the present disclosure.

As shown in FIG. 5, each residual group includes three residual dual attention fusion modules connected in series and a convolutional layer. The input features are input into the residual dual attention fusion modules and the convolutional layer, and an output of the residual group is obtained by element-by-element summation of an output result and the input features. Expressions of the output of the residual group are as follows:

$$F_{g,m} = H_{RDAFM}(F_{g,m-1}) \tag{7}$$

$$F_g = \text{Conv}(F_{g,3}) \oplus F_{g,0} \tag{8}$$

$$F_g = H_{RG}(F_{g,0}) \tag{9}$$

where $F_{g,m-1}$ and $F_{g,m}$ represent an input and an output of an mth residual dual attention fusion module in a gth residual group, respectively, g=1, 2, 3, and m=1, 2, 3; a mapping function from an input $F_{g,m-1}$ of the residual dual attention fusion module to an output $F_{g,m}$ of the residual dual attention fusion module is $H_{RDAFM}$; and a mapping function from an input $F_{g,0}$ of the residual group to the output $F_g$ of the residual group is $H_{RG}$.

Figure 6:
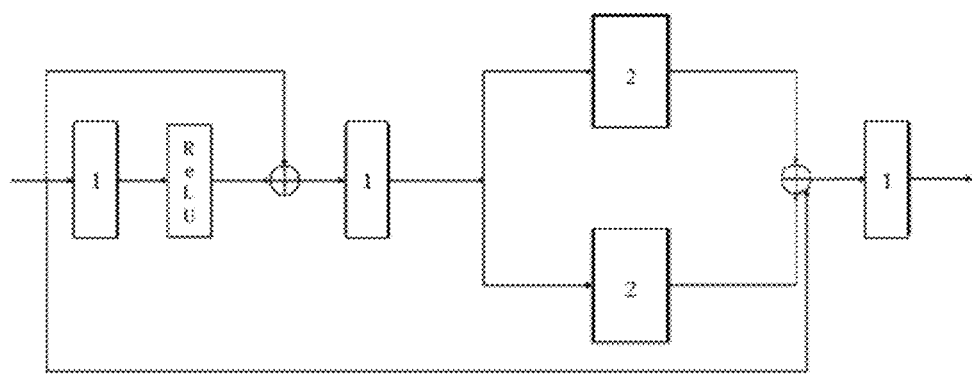
FIG. 6 is a schematic diagram of a residual dual attention fusion module according to an embodiment of the present disclosure.
Figure 7:
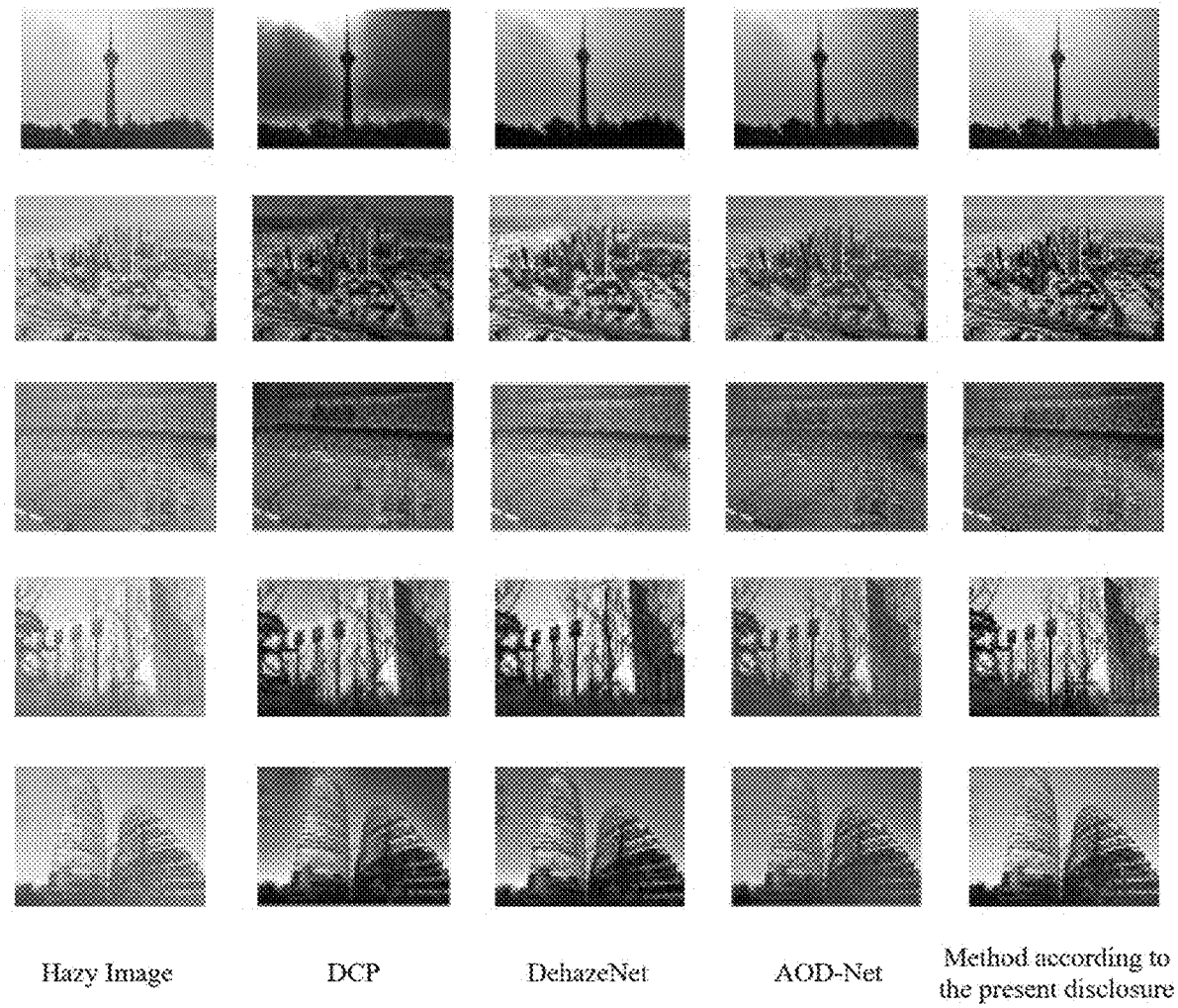
FIG. 7 is a comparison diagram of haze removal effects of an image haze removal method according to an embodiment of the present disclosure and other methods.

As shown in FIG. 6, the residual dual attention fusion module includes a residual block, a first convolutional layer, a channel attention module, a pixel attention module, and a second convolutional layer. The residual block includes a convolutional layer and an ReLU activation function. An output of the residual block is connected to inputs of the channel attention module and the pixel attention module via the first convolutional layer, and outputs of the channel attention module and the pixel attention module are fused, such that the output of the residual dual attention fusion module is obtained by inputting the outputs of the channel attention module and the pixel attention module and an input of the residual block into the second convolutional layer for fusion after element-by-element summation. Thus, pixel features are obtained while the global dependency of the output of the residual dual attention fusion module in each feature map is enhanced. Expressions of the output of the residual dual attention fusion module are as follows:

$$F_{RB} = \delta(\text{Conv}(F)) \oplus F \tag{10}$$

$$F^* = \text{Conv}(F_{RB}) \tag{11}$$

$$F_{RDAFM} = \text{Conv}(F_{CAB}(F^*) \oplus F_{PAB}(F^*) \oplus F) \tag{12}$$

$$F_{RDAFM} = H_{RDAFM}(F) \tag{13}$$

where $\oplus$ represents element-by-element summation, $F_{RB}$ represents the output of the residual block, $F^*$ represents the inputs of the attention modules, and a mapping function from the input F of the residual dual attention fusion module to the output $F_{RDAFM}$ of the residual dual attention fusion module is $H_{RDAFM}$.

The haze removal model is trained by the following steps: acquire an RESIDE dataset, and construct a training sample set by randomly selecting 6000 pairs of hazy images and haze-free images from the RESIDE dataset; and train the neural network with the training sample set to obtain the haze removal model. During use, the hazy image to be processed is acquired and input into the haze removal model to obtain the haze-free image.

A loss function L of the neural network is expressed as:

$$L = \frac{1}{N}\sum_{i=1}^{N}\|\hat{J}_i - J_i^{gt}\|_1 \tag{14}$$

where N is the number of training samples, $J_i^{gt}$ is a real clear image of an ith training sample, and $\hat{J}_i$ is a haze-free image estimated by the neural network for the ith training sample.

In the neural network, weight parameters of the network are initialized with an Adam optimizer, where default values of $\beta_1$ and $\beta_2$ are 0.9 and 0.999, respectively. An initial learning rate $\alpha$ is set as $1 \times 10^{-4}$. The learning rate is updated using a cosine annealing strategy, and is adjusted from the initial value to 0:

$$\alpha_t = \frac{1}{2}\left(1 + \cos\left(\frac{t\pi}{T}\right)\right)\alpha$$

where T is the total number of batches, $\alpha$ is the initial learning rate, t is a current batch, and $\alpha_t$ is an adaptively updated learning rate.

For each sample image input into the training set of the haze removal network model, the total loss of the difference between a real clear image and a haze-removed image restored by the network is first obtained using forward propagation, and then weight parameters are updated based on the Adam optimizer. The total number of training steps is $1 \times 10^5$, and every 200 steps is a batch, for a total of 500 batches. The above steps are repeated until the set maximum step length is reached, so as to obtain the trained haze removal network model, with expressions as follows:

$$F_0 = \text{Conv}(I) \tag{16}$$

$$F_g = H_{RG}(F_{g-1}) \tag{17}$$

$$F = \text{ⓕ}\{F_3, F_2, F_1\} \tag{18}$$

$$\hat{J} = \text{Conv}(\text{Conv}(H_{PAB}(H_{CAB}(F)))) \oplus I \tag{19}$$

where I represents the input hazy image, $F_{g-1}$ and $F_g$ represent an input and an output of the gth residual group, respectively, g=1, 2, 3, ⓕ{•} represents the operation of in-channel connection, and $\hat{J}$ represent a restored output image.

Example 2

In this example, an image haze removal apparatus is further provided. The apparatus includes:

an image acquiring module, configured to acquire a hazy image to be processed; and an image haze removal module, configured to input the hazy image to be processed into a haze removal model for processing, and output a haze-free image corresponding to the hazy image to be processed.

The haze removal model includes a plurality of residual groups. Each of the residual groups includes a plurality of residual dual attention fusion modules connected in series. Each of the residual dual attention fusion modules includes a residual block, a first convolutional layer, a channel attention module, a pixel attention module, and a second convolutional layer. An output of the residual block is connected to inputs of the channel attention module and the pixel attention module via the first convolutional layer. Outputs of the residual dual attention fusion modules are obtained by inputting outputs of the channel attention module and the pixel attention module and an input of the residual block into the second convolutional layer for fusion after element-by-element summation, such that pixel features are obtained while global dependency of each feature map is enhanced.

Example 3

In this example, a device is further provided. The device includes a memory, a processor, and a computer program stored on the memory and capable of running on the processor. The processor, when executing the computer program, implements the image haze removal method according to Example 1.

Those skilled in the art will appreciate that the embodiments of the present application may be provided as methods, systems, or computer program products. Therefore, the present application may take the form of a full hardware embodiment, a full software embodiment, or an embodiment combining software and hardware. Besides, the present application may adopt the form of a computer program product implemented on one or more computer available storage media (including but not limited to a disk memory, a CD-ROM, an optical memory and the like) including computer available program codes.

The present application is described with reference to the flow diagram and/or block diagram of the method, device (system), and computer program product according to the embodiments of the present application. It should be understood that each flow and/or block in the flow diagram and/or block diagram and the combination of flows and/or blocks in the flow diagram and/or block diagram may be implemented by computer program instructions. These computer program instructions may be provided to processors of a general-purpose computer, a special-purpose computer, an embedded processor or other programmable data processing devices to generate a machine, such that instructions executed by processors of a computer or other programmable data processing devices generate an apparatus for implementing the functions specified in one or more flows of the flow diagram and/or one or more blocks of the block diagram.

These computer program instructions may also be stored in a computer-readable memory capable of guiding a computer or other programmable data processing devices to work in a specific manner, such that instructions stored in the computer-readable memory generate a manufactured product including an instruction apparatus, and the instruction apparatus implements the functions specified in one or more flows of the flow diagram and/or one or more blocks of the block diagram.

These computer program instructions may also be loaded on a computer or other programmable data processing devices, such that a series of operation steps are executed on the computer or other programmable devices to produce computer-implemented processing, and thus, the instructions executed on the computer or other programmable devices provide steps for implementing the functions specified in one or more flows of the flow diagram and/or one or more blocks of the block diagram.

The above are only preferred implementations of the present disclosure. It should be noted that those of ordinary skill in the art can also make several improvements and transformation without departing from the technical principle of the present disclosure, and these improvements and transformation shall also fall within the scope of the present disclosure.

What is claimed is:

1. An image haze removal method, comprising:
acquiring a hazy image to be processed; and
obtaining a haze-free image corresponding to the hazy image to be processed by inputting the hazy image to be processed into a pre-trained haze removal model, wherein the pre-trained haze removal model comprises a plurality of residual groups, each of the residual groups comprises a plurality of residual dual attention fusion modules connected in series, each of the residual dual attention fusion modules comprises a residual block, a first convolutional layer, a channel attention module, a pixel attention module, and a second convolutional layer, an output of the residual block is connected to inputs of the channel attention module and the pixel attention module via the first convolutional layer, and outputs of the channel attention module and the pixel attention module are fused for output processing, such that pixel features are obtained while global dependency of each feature map is enhanced.

2. The image haze removal method according to claim 1, wherein the haze removal model comprises three residual groups, and the three residual groups are in in-channel connection according to outputs from back to front.

3. The image haze removal method according to claim 1, wherein each of the residual groups comprises three residual dual attention fusion modules.

4. The image haze removal method according to claim 1, wherein the outputs of the residual dual attention fusion modules are obtained by inputting the outputs of the channel attention module and the pixel attention module and an input of the residual block into the second convolutional layer for fusion after element-by-element summation.

5. The image haze removal method according to claim 1, wherein the haze removal model further comprises a feature extraction convolutional layer, a channel attention module, a pixel attention module, and an output convolutional layer, the hazy image to be processed enters the residual groups after being subjected to feature extraction by the feature extraction convolutional layer, and enters the channel attention module, the pixel attention module and the output convolutional layer in sequence for processing after being processed by the residual groups, so as to obtain output features, and the haze-free image is obtained by performing element-by-element summation on the output features and the hazy image to be processed.

6. The image haze removal method according to claim 1, wherein the haze removal model is trained by:
acquiring an RESIDE dataset, and constructing a training sample set by randomly selecting 6000 pairs of hazy images and haze-free images from the RESIDE dataset; and
training a pre-established neural network with the training sample set.

7. The image haze removal method according to claim 6, wherein a loss function L of the neural network is expressed as:

$$L = \frac{1}{N}\sum_{i=1}^{N}\|\hat{J}_i - J_i^{gr}\|_1 \quad (1)$$

where N is the number of training samples, $J_i^{gr}$ is a real clear image of an ith training sample, and $\hat{J}_i$ is a haze-free image estimated by the neural network for the ith training sample.

8. An image haze removal apparatus, comprising:
an image acquiring module, configured to acquire a hazy image to be processed; and
an image haze removal module, configured to input the hazy image to be processed into a haze removal model for processing, and output a haze-free image corresponding to the hazy image to be processed, wherein the haze removal model comprises a plurality of residual groups, each of the residual groups comprises a plurality of residual dual attention fusion modules connected in series, each of the residual dual attention fusion modules comprises a residual block, a first convolutional layer, a channel attention module, a pixel attention module, and a second convolutional layer, an output of the residual block is connected to inputs of the channel attention module and the pixel attention module via the first convolutional layer, and outputs of the channel attention module and the pixel attention module are fused, such that pixel features are obtained while global dependency of each feature map is enhanced.

9. The image haze removal apparatus according to claim 8, wherein the outputs of the residual dual attention fusion modules are obtained by inputting the outputs of the channel attention module and the pixel attention module and an input of the residual block into the second convolutional layer for fusion after element-by-element summation.

10. A device, comprising a memory, a processor, and a computer program stored on the memory and capable of running on the processor, wherein the processor, when executing the computer program, implements the image haze removal method according to claim 1.

* * * * *